United States Patent Office 3,405,072
Patented Oct. 8, 1968

3,405,072
METHOD OF INHIBITING CORROSION OF AQUEOUS MEDIUMS BY ADDITION OF LITHIUM SALTS OF ORGANIC ACIDS
James W. Kinnavy, Oak Lawn, Ill., assignor to Continental Can Company, Inc., New York, N.Y., a corporation of New York
No Drawing. Filed Jan. 5, 1966, Ser. No. 518,797
10 Claims. (Cl. 252—389)

ABSTRACT OF THE DISCLOSURE

The corrosion of metal surfaces in contact with aqueous non-edible compositions is inhibited by adding to the aqueous compositions an effective amount of a lithium salt of a compound selected from naphthenic acid, ethyl hexoic acid, polyacrylic acid, and styrene-substituted maleic acid and the anhydride thereof.

---

This invention is directed to a method of protecting metal surfaces from corrosion and more particularly to the use of certain lithium salts of organic acids as a corrosion inhibitor in aqueous compositions.

In general, this invention is directed to a method of protectng metal surfaces from corrosion by using a lithium salt of certain organic acids whose unexpected corrosion resistant properties were found to be highly effective as inhibitors in water-based, non-food formulations. The lithium salts of the organic acids of this inventon are effective as in situ inhibitors n protecting metal surfaces aganst corrosion due to the action of oxygen and water. More particularly, the lithium salts of the organic acids have been found to be effective in protecting ferrous metal surfaces normally in contact with atmospheric air or aqueous compositions containing water, oxygen and other corrosive components.

Generally, any metal salt of an effective inhibiting organic acid, high in single electron potential, and water-soluble, may function as an in situ inhibitor in certain water-based compositions. It has been found, however, that only certain organic acids coupled with a metal cation, are highly effective corrosion inhibitors, which effectiveness increases as the electron potential of the cation increases. Lithium, of course, has the highest single electron potential of any metal cation and, therefore, when coupled with a particular organic acid, forms effective water-soluble corrosion inhibitors.

The corrosion of metal surfaces due to the action of water and oxygen is well known. Attempts to protect these metal surfaces have been successful but in many instances not completely satisfactory. Thus, for example, one method comprises treating the metal with an inhibitor by coating the surface to form a protective film. This method is not entirely successful but has proven satisfactory where preparing protective films is not costly or does not present any particular problems. Presently, various aqueous compositions including industrial and household products, e.g., water-base furniture and wax polishes, latex paints, etc., are packaged in metal containers. It is a normal practice in the packaging industry to provide these containers with inert enamel coatings to prevent corrosion, particularly where the product must remain in contact with the metal during long periods of storage. Thus, to avoid having to coat the metal surfaces to prevent corrosion, it was been found that small but effective amounts of lithium salts of certain organic acids may be used as in situ inhibitors. This approach not only overcomes the problem of corrosion but also substantially lowers the packaging costs. It has been found that lithium salts of certain organic acids, when added to corrosive water-base compositions, i.e., an aqueous paint composition, retards head-space corrosion in tinplate containers and the like.

Accordingly, it is an object of this invention to provide a lithium salt of an organic acid which may be added to aqueous compositions for purposes of inhibiting corrosion. More particularly, it is an object of this invention to provide lithium salts of certan organic acids which may be added in small but effective amounts to aqueous compositions to inhibit corrosion of tinplate.

It is another object of this invention to provide a method of inhibiting corrosion in metal containers used for packaging aqueous non-edible compositions by adding to said compositions small amounts of a lithium salt of an organic acid.

It is still another object of this invention to provide a lithium salt of an organic acid as an in situ inhibitor for water-base industrial and household products which prevents corrosion of tinplate containers and the like.

These and other objects of the invention will become apparent from a further and more detailed description as follows:

It has been found, quite unexpectedly, that the addition of certain lithium salts of organic acids to aqueous base compositions inhibits the corrosion of the metal container used in packaging said compositions. More particularly, it has been found that small but effective amounts of a lithium salt of certain acids may be used as a corrosion inhibitor in non-edible aqueous compositions. These inhibitors include a lithium salt of naphthenic acid, a lithium salt of ethylhexoic acid, a lithium salt of a polyacrylic acid, and a lithium salt of a styrene-substituted maleic acid or the anhydride thereof. These lithium salts are added to the aqueous based composition in amounts ranging from 0.001 to 5% and more preferably, in an amount ranging from about 0.1 to 2.0% by weight of the composition.

Generally, for example, in packaging aqueous compositions such as aqueous polishing waxes or the like, the metal containers usually show pitted corrosion, the extent of which varies between different lots of cans. In the past, however, pitting has varied to the extent that perforations have been encountered. Electrochemical studies have shown that air trapped in the air space of a metal container used in packaging various aqueous wax compositions, for example, acts as a depolarizer and, thus, increases the rate of corrosion. This is usually referred to as differential aeration corrosion. To reduce this type of corrosion, a lithium salt of naphthenic acid, for example, was added to the aqueous system and evaluated by the corrosivity test cell and the polarization conductance test. The lithium salt inhibitor was evaluated in flushed and non-flushed (air space) product containers.

The polarization conductance test consists in the determination of the amount of current required to anodically polarize a $0.003^2$ steel area to 0.0 volt in reference to a standard calomel electrode. The amount of current required is used as the index of the conductance of corrosion current. The corrosivity test cell consists of coupling three fixed areas of metal (steel—0.036 inch$^2$ tin—0.045 inch$^2$, and 2/8 solder—0.045 inch$^2$) immersed in an aqueous composition under controlled conditions. An initial and the 24-hour metal potentials and current flow readings were used as the index to the corrosiveness of the product.

TABLE I.—POLARIZATION CONDUCTANCE TEST

| Examples (tinplate containers) | Cell cond. | Current to pol. to 0.0 volts, μa |
|---|---|---|
| (1) Commercially available aqueous furniture polish wax composition | NF | 50.0 |
| (2) No. 1+0.01% Lithium naphthenate | NF | 2.4 |
| (3) No. 1+0.10% Lithium naphthenate | NF | 0.25 |
| (4) No. 1+1.0% Lithium naphthenate | NF | 0.40 |
| (5) No. 1+0.20% Lithium naphthenate | NF | 0.20 |
| (6) No. 1 | N$_2$ | 3.1 |
| (7) No. 1+0.20% Lithium naphthenate | N$_2$ | 0.10 |

It can be seen from the data in the above table that air increases the corrosiveness of the wax composition to the containers as indicated by comparing Example 1 with Example 6. Here, the latter was flushed (the air head-space) with nitrogen and compares favorably with Example 1 which represents an untreated aqueous wax composition with an air head-space. In addition, it can be seen by comparing Examples 1 through 5 and 7 that the addition of various amounts of lithium naphthenate, for example, decreases the corrosiveness of the aqueous wax composition to the containers.

TABLE II.—CORROSIVITY TEST RESULTS, 24 HRS., 100° F.

| Tinplate containers | Potentials (−mv.) | | | | Current, μa* | | | Int. steel pot. |
|---|---|---|---|---|---|---|---|---|
| | Steel | Tin | Solder | Cpl. | Steel | Tin | Solder | |
| (1) Commercially available furniture polish wax composition | 448 | 417 | 412 | 447 | 0.03 | 0 | −0.03 | 443 |
| (2) No. 1+0.2% lithium naphthenate | 252 | 527 | 375 | 268 | −0.11 | 0.02 | 0.09 | 402 |

*Negative current results indicate metal is cathodic. Positive current results indicate metal is anodic.

It can be seen from Examples 1 and 2 of Table II that 0.2 lithium naphthenate produces a more passive potential on steel after 24 hours which is still cathodic to both tin and solder.

Typical examples showing the various aqueous based compositions which may be modified by the addition thereto of effective amounts of a lithium salt as the corrosion inhibitor in accordance with this invention are as follows:

Example I

| | Parts by weight |
|---|---|
| Beeswax | 20 |
| Yellow carnauba wax | 20 |
| Water | 400 |
| Isobutanol | 50 |
| Glycerine | 6 |
| Metal sulfonate | 1.5 |
| Lithium naphthenate | 2.5 |

Example II

| | Parts by weight |
|---|---|
| Beeswax | 25 |
| Yellow carnauba wax | 35 |
| Ethylene glycol monomethyl ether | 65 |
| Water | 360 |
| Glycerine | 8 |
| Diethyl amine | 1.0 |
| Lithium naphthenate | 6.0 |

Example III

| | Parts by weight |
|---|---|
| Carnauba wax | 25 |
| Paraffin wax | 20 |
| Water | 150 |
| Glycerine | 300 |
| Morpholine | 1.0 |
| Lithium salt of ethylhexoic acid | 4.0 |

Example IV

| | Parts by weight |
|---|---|
| Wax | 40–60 |
| Organic solvent | 0.5–10 |
| Emulsifying agent | 0.2–10 |
| Water (approximately) | 25–40 |
| Lithium salt of polyacrylic acid | 0.1–2.0 |

The waxes used for the above compositions may include paraffin hydrocarbon waxes, and the various vegetable waxes such as carnauba, candelilla, Japan, etc. These waxes may be used to prepare water emulsions which contain organic emulsifying agents such as the water-soluble soaps of fatty acids, water-soluble soaps of rosin and tall oil, and the water-soluble emulsifiers prepared by reacting a fatty acid with an alkaline material such as a lower mole weight organic amine. Other emulsifying agents which may be used in preparing aqueous wax compositions include the alkali metal salts of the sulfonic acids, such as the aryl sulfonic acids, alkylaryl sulfonic acids, etc. The solvent used in combination with the emulsifying agent and the wax includes, for example, the volatile solvents such as kerosene, gasoline, high flush naphtha, mineral spirits and the like.

In addition to the aqueous wax compositions, various water-based paints may be modified by the addition of the lithium salts as the corrosion inhibitor in accordance with this invention, as illustrated by the following example.

Example V

| | Parts by weight |
|---|---|
| Vinyl acetate polymer | 100–150 |
| Surface active agent | 0.5–5.0 |
| Plasticizer | 4–20 |
| Defoamer | 0.1–0.5 |
| Pigment | 20–200 |
| Water | 70–150 |

The pigments used in the above example normally include such materials as titanium oxide, iron oxides, lithopone, carbon black, etc. The plasticizers are normally dibutyl, diisobutyl, butyl benzyl and dioctyl phthalates. The surface active agent includes such materials as the polyether alcohols, alkali metal salts of the alkylaryl polyether sulfonates, alkylphenyl polyethylene glycol ethers, alkyl esters of sodium sulfo-succinic acid, and the like.

The lithium salts of the organic acids of this invention are used in amounts ranging from about 0.001 to 5.0% by weight of the aqueous compositions and are selected from the group consisting of lithium naphthenate, lithium 2-ethyl-hexoic acid, a lithium salt of polyacrylic acid, and a lithium salt of styrene-substituted maleic acid or the anhydride thereof. The polyacrylic acids may be used in the form of an emulsion commercially available as Acrysol which comprises an emulsion of the acid in water with a solid content of approximately 28%, a pH of 3.5 and a viscosity of 4.0 cps. A 5% lithium salt of the acid emulsion, for example, has a solution of viscosity of about 25,000 cps., whereas a 1% lithium salt has a solution viscosity of about 3,000 cps.

The lithium salts of polyacrylic acid may be characterized as polymerized acrylic acid wherein the alpha-beta unsaturated links have been joined to one another to form a polymeric chain which has carboxylic groups pendent to said chain and may be illustrated as follows:

(I)
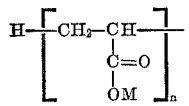

wherein M is lithium and $n$ has a value ranging from 2 to 60.

The lithium salts may be prepared from styrene-substituted maleic acid and the anhydride thereof which may be characterized as:

(II)
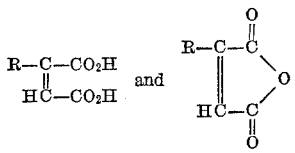

wherein R is a styrene radical.

The corrosion inhibiting salts of this invention are particularly useful as in situ inhibitors for non-edible aqueous compositions including, for example, water-based paint, water-based industrial and household products such as cleaning solutions, wax emulsions, furniture polishes and the like. These compositions are normally packaged with or without pressure in metal containers, i.e., aerosol cans, which are subject to corrosion in the presence of oxygen and water.

While this invention has been described with respect to a number of specific embodiments, it is obvious that there are other variations and modifications which can be resorted to without departing from the spirit of the invention, except as more particularly pointed out in the appended claims.

I claim:
1. A method of inhibiting the corrosion of metal surfaces in contact with aqueous non-edible compositions which comprises adding to said aqueous compositions an effective amount of a lithium salt of a compound selected from the group consisting of naphthenic acid, ethylhexoic acid, a polyacrylic acid having the formula:

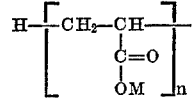

wherein M is lithium and $n$ has a value ranging from 2 to 60, and styrene-substituted maleic acid and the anhydride thereof.

2. The method of claim 1 further characterized in that an effective amount of the lithium salt ranges from about 0.001 to 5.0% by weight of the aqueous composition.

3. The method of claim 1 further characterized in that an effective amount of the lithium salt ranges from about 0.1 to 2.0% by weight of the aqueous composition.

4. The method of claim 3 further characterized in that the composition is an aqueous wax emulsion.

5. The method of claim 3 further charatcerized in that the composition is an aqueous latex paint.

6. The method of claim 1 further characterized in that the salt is a lithium salt of naphthenic acid.

7. The method of claim 1 further characterized in that the salt is a lithium salt of a styrene-substituted maleic anhydride.

8. A method of inhibiting the corrosion of metal surfaces in contact with aqueous non-edible compositions which comprises adding to said aqueous compositions an effective amount of a lithium salt of ethylhexoic acid.

9. A method of inhibiting the corosion of metal surfaces in contact with aqueous non-edible compositions which comprises adding to said aqueous compositions an effective amount of a lithium salt of a polyacrylic acid having the formula:

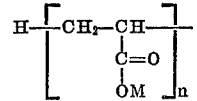

wherein M is lithium and $n$ has a value ranging from 2 to 60.

10. A method of inhibiting the corrosion of metal surfaces in contact with aqueous non-edible compositions which comprises adding to said aqueous compositions an effective amount of a lithium salt of styrene-substituted maleic acid.

References Cited
UNITED STATES PATENTS

| | | | |
|---|---|---|---|
| 2,723,956 | 11/1955 | Johnson | 252—181 X |
| 2,726,215 | 12/1955 | Jones | 252—389 |
| 2,783,200 | 2/1957 | Crum et al. | 252—181 X |
| 2,799,604 | 7/1957 | Ness | 148—14 |
| 3,247,124 | 4/1966 | Kimble et al. | 252—389 X |

OTHER REFERENCES

The Condensed Chemical Dictionary, Reinhold, 1961, pp. 777–778.

Bregman, J. I., Corrosion Inhibitors, MacMillan Company, 1963, Chapter 1, p. 3.

Chemical Abstracts, ACS., vol. 52, p. 7105a.

LEON D. ROSDOL, *Primary Examiner.*

I. GLUCK, *Assistant Examiner.*